Patented Dec. 5, 1944

2,364,075

UNITED STATES PATENT OFFICE 2,364,075

DISINFECTANT COMPOUNDS

Madison Hunt, Claymont, and James E. Kirby, Wilmington, Del., and John F. Lontz, Gadsden, Ala., assignors to E. I. du Pont de Nemours & Company, Wilmington, Del., a corporation of Delaware No Drawing. Application October 15, 1942, Serial No. 462,090

4 Claims. (Cl. 260—564)

This invention relates to new disinfectant compositions. More particularly, it refers to alkylene bis-carbonamidine derivatives which have been found to be surprisingly effective as disinfectants.

Many disinfectant compositions have been described in the scientific literature. These compositions are, for the most part, quite limited in their fields of use. One reason for this limitation is that many of them lose all or most of their activity in the presence of blood, blood serum, and other natural protein materials. Another reason for this limitation in the field of use of many of these compounds is that they contain mercury or other heavy metals which produce undesirable side reactions with many sensitive individuals. A still further reason for the restricted applicability of these compounds is that many of them are effective only on certain species of bacteria or certain types of wounds or other infected areas.

It is an object of this invention to produce disinfectant compositions which are free from the aforementioned disadvantages and the numerous other disadvantages which directly or indirectly result therefrom. A further object is to produce new disinfectant compositions which maintain their high potency under conditions wherein the prior art disinfectants would be rendered relatively impotent or even harmful. A still further object is to produce a new class of disinfectant compositions which are effective in destroying not only bacteria and other undesirable animal organisms but also fungus, molds and other plant organisms. A still further object is to produce new amidine derivatives which in addition to being valuable disinfectants are also suitable for numerous other uses. Additional objects will become apparent from a consideration of the following description and claims.

These objects are attained in accordance with the present invention wherein a disinfectant having the following general formula is produced:

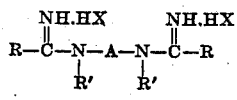

wherein A is a bivalent radical containing a straight chain of at least four atoms between the amidine groups; R is a monovalent radical containing at least six carbon atoms; R' is hydrogen or a monovalent radical containing less than six carbon atoms; and X is an anion. In a more restricted sense these objects are achieved by the production of a compound corresponding to the aforesaid general formula wherein A represents a bivalent hydrocarbon radical of at least four carbon atoms in a chain; R represents a monovalent hydrocarbon radical of at least six carbon atoms; R' represents hydrogen or a monovalent hydrocarbon radical of less than six carbon atoms; and X represents an anion of an acid having a dissociation constant greater than $1 \times 10^{-11}$. In a still more restricted sense this invention pertains to disinfectant compositions containing a compound corresponding to the aforesaid general formula wherein A, R and R' are unsubstituted; R is an aliphatic radical; and R' is also an aliphatic radical when it is not hydrogen. In its preferred embodiment this invention is concerned with a disinfectant compound conforming to the following general formula:

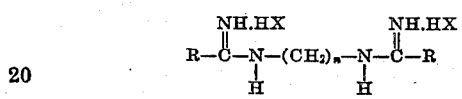

wherein R is a straight chain, unsubstituted, saturated alkyl group of ten to eighteen carbon atoms; $n$ is an integer from six to ten; and X is an anion of a strong inorganic acid having a dissociation constant greater than $1 \times 10^{-3}$. Additional embodiments of the invention pertain to the production of new compounds such as N,N'-hexamethylene-bis-lauramidine hydrochloride, and N,N'-decamethylene-bis-lauramidine hydrochloride, which not only have surprisingly effective bactericidal, insecticidal and fungicidal properties but also have a variety of other uses in the industrial arts.

As an aid to understanding more thoroughly some of the many embodiments of this invention, a brief reference will now be made to the manner of producing compounds possessing the aforementioned desirable features. Many of the disinfectant compounds embraced herein are acid addition salts of a bis-amidine in which the amidine groups are separated by a divalent hydrocarbon grouping containing a chain of four or more carbon atoms and attached thereto through a nitrogen atom of each amidine group, said nitrogen atom being substituted by hydrogen or a low molecular weight alkyl group of less than six carbon atoms, and further characterized by having substituted on the carbon bearing the imino group in each amidine group an aliphatic group of six or more carbon atoms.

These compounds may be prepared by reacting in a suitable solvent one equivalent of a diamine, for example, decamethylenediamine, with two equivalents of an imino ether salt such as lauronitrile methyliminoether hydrochloride. The reaction may be carried out by mixing the reactants together in ethanol solution at room temperature and allowing them to remain at 25–30° for 24 hours. The product may then be isolated by concentration of the solution in vacuo. The product may be washed with ether and if crystalline may be recrystallized from an alcohol-ether mixture. The yields are practically quantitative. The products are, in general, exceedingly hygroscopic white solids, soluble in water and alcohol but insoluble in ether, benzene, petroleum ether, and chloroform. These bis-amidine salts in general show high bactericidal activity when their solutions in alcohol or in water are applied to bacterial organisms.

The imino ethers used in preparing the products of this invention may be readily obtained by the action of hydrochloric acid and an alcohol on the corresponding nitriles. The method has been extensively described in the literature. Diamines may be conveniently prepared by any of the classical methods of synthesis of these compounds.

The invention may be more readily understood by a consideration of the following illustrative examples wherein the quantities are stated in parts by weight:

Example I

*N,N'-hexamethylene - bis - lauramidine dihydrochloride*

To a solution of 11.6 parts of hexamethylenediamine in 100 parts of methanol is added 50 parts of lauronitrile methyliminoether hydrochloride in 200 parts of methanol. The mixture warms spontaneously to a slight extent. The solution is allowed to stand four days at room temperature and the methanol is then removed in vacuo. The residue is washed with dry ether and dried in vacuo over phosphorus pentoxide. The yield is almost quantitative. The product is a white hygroscopic solid soluble in water and in alcohol but insoluble in ether, petroleum ether, and benzene. Anal. calc'd for $C_{30}H_{64}N_4Cl_2$: Cl, 12.88. Found: Cl, 12.76.

The free amidine is obtained readily from the salt by dissolving 55 parts of N,N'-hexamethylene-bis-lauramidine hydrochloride in 200 parts of water and adding 10 parts of sodium hydroxide in 100 cc. of water. The oil which separates is extracted with ether. The product is isolated by evaporation of the ether. N,N'-hexamethylene-bis-lauramidine is a thick, viscous, oil soluble in alcohol, ether, and benzene but only slightly soluble in water. The yield of free amidine from the salt is quantitative. The free amidine base may be converted to a new salt by redissolving in an acid, as, for example, in an aqueous solution containing 9.8 parts of sulfuric acid. A solution of the sulfate of the amidine is obtained.

When tested for bactericidal activity by the standard F. D. A. method (Food & Drug Administration), N,N-hexamethylene - bis - lauramidine dihydrochloride in dilutions of 1:10,000 kills *Staphylococcus aureus* in ten minutes. If the above test is carried out in the presence of 10% horse blood serum, the compound kills *Staphylococcus aureus* in dilutions of 1:5,000 in ten minutes. In the presence of 10% citrated human blood, the compound shows a killing dilution of 1:1,000 in thirty minutes. Tests for bacteriostatic activity when carried out as described in elementary laboratory texts on bacteriology reveal that N,N'-hexamethylene-bis-lauramidine dihydrochloride in dilutions of 1:266,000 inhibits the growth of *Staphylococcus aureus* for two days.

The minimum lethal dose, i. e., the dose killing 50% of the animals, when administered to mice by the intraperitoneal route, is found to be 30 mg./kg.

The equation for the reaction described in the above example is as follows:

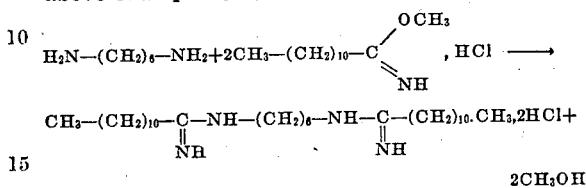

Example II

*N,N'-decamethylene - bis - lauramidine dihydrochloride*

To a solution of 17.2 parts of decamethylenediamine in 100 parts of absolute methanol is added 50 parts of lauronitrile methyl iminoether hydrochloride dissolved in 200 parts of methanol. The mixture is allowed to stand at 25–30° for 72 hours. The methanol is then removed by evaporation in vacuo. The residue is washed with dry ether and dried in vacuo over phosphorus pentoxide. The yield is quantitative. The product is a hygroscopic, crisp, white solid soluble in water and in alcohol but insoluble in ether, petroleum ether, and benzene. Anal. calc'd for $C_{34}H_{72}N_4Cl_2$: Cl, 11.70. Found: Cl, 11.51.

The free amidine may be obtained from the salt by a process similar to that described in Example I.

When tested for bactericidal activity by the standard F. D. A. method, N,N'-decamethylene-bis-lauramidine dihydrochloride kills *Staphylococcus aureus* in ten minutes at a dilution of 1:10,000. When the test is carried out in the presence of 10% citrated human blood, the killing dilution is found to be 1:1,000 in five minutes. The compound shows bacteriostatic action at a dilution of 1:500,000 against *Staphylococcus aureus*.

The equation for the reaction described in the above example is as follows:

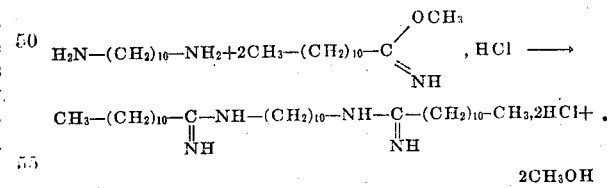

Example III

*N,N'-dodecamethylene-bis-lauramidine dihydrochloride*

To a solution of 10 parts of dodecamethylenediamine in 50 parts of methanol is added a solution of 25 parts of lauronitrile methyliminoether hydrochloride in 200 parts of dry methanol. The mixture is allowed to stand at 25–30° for five days. The methanol is then removed in vacuo, leaving a crisp, white, hygroscopic residue which is washed with anhydrous ether and dried in vacuo over phosphorus pentoxide. The yield of product is 25 parts. Anal. calc'd for $C_{36}H_{72}N_4Cl_2$: Cl, 11.19. Found: Cl, 10.91.

When this compound is tested for bactericidal activity as described in the preceding example, the killing dilution for *Staphylococcus aureus* is found to be 1:10,000. In the presence of 10% blood serum, the killing dilution against this same organism is found to be 1:5,000 in ten minutes, while in the presence of 10% citrated human blood, the killing dilution is found to be 1:1,000 in five minutes. This compound is found to have bacteriostatic activity at dilutions of 1:330,000.

The equation for the reaction described in the above example is as follows:

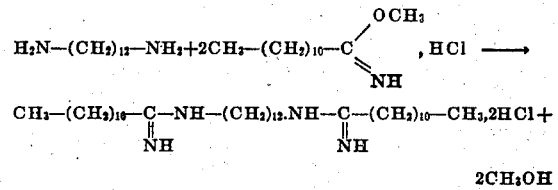

It is to be understood that the foregoing examples are representative merely of a few of the numerous embodiments embraced within the scope of this invention. They may be varied widely with respect to the individual reactants, the amounts thereof, and the conditions of reaction without departing from the scope hereof.

Amidine derivatives conforming to the present invention for the most part may be represented by the general formulas previously referred to herein. They may be prepared by reacting imino ether salts with diamines, as has been mentioned heretofore.

Imino ether salts suitable for this purpose, in general, conform to the following formula:

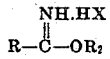

wherein R represents a monovalent radical containing at least six carbon atoms; X represents an anion; and $R_2$ represents a lower molecular weight grouping, preferably a lower alkyl group containing less than six carbon atoms, such as a methyl or ethyl group. R and X are understood, of course, to have the more limited definitions previously referred to herein for said radicals in the more restricted and preferred embodiments of this invention.

Diamines suitable for use in preparing the majority of these amidine derivatives conform to the following general formula:

wherein R' represents hydrogen or a monovalent radical containing less than six carbon atoms; and A represents a bivalent radical containing a straight chain of at least four atoms between the amidine groups. As in the case of R and X above, it is to be understood that R' and A have the more limited definitions previously given for said radicals in the more restricted and preferred embodiments of this invention.

Bivalent radicals previously referred to herein by the designation A may be aliphatic, aromatic, cyclic, acyclic, straight chain, branched chain, saturated, unsaturated, substituted or unsubstituted. Likewise, this radical may be a mixture of two or more of the foregoing types or other types equivalent thereto or suggested thereby. It should contain at least four atoms in a straight chain, preferably carbon atoms. This bivalent radical is preferably a straight chain, unsubstituted, polymethylene group of 6-10 carbon atoms.

The monovalent radical heretofore designated as R may be an aliphatic group of six or more carbon atoms. It may be straight chain, branched chain, saturated, unsaturated, substituted, unsubstituted, cyclic or acyclic. This radical is preferably an unsubstituted straight chain, saturated alkyl group of 10–18 carbon atoms. It is understood that the disinfectant compositions described herein may contain mixtures of two or more diamidines. In fact, compositions containing a mixture of amidine derivatives wherein the R groups are from 8 to 18 carbon atoms are of the preferred class.

The radical heretofore designated by R' may be hydrogen or a monovalent group containing less than six carbon atoms. As in the case of the other groups this one may likewise be straight or branched chain, saturated or unsaturated, and substituted or unsubstituted. It is advisably a lower saturated, unsubstituted, alkyl group such as methyl, ethyl, propyl, isopropyl, butyl or amyl. The majority of the preferred compounds have hydrogen for the component represented by R'.

The anion herefore represented by X is advisably an anion of any organic or inorganic acid of ionization constant greater than $1\times10^{-11}$, although it is not restricted thereto. Suitable acids conforming to the aforesaid requirement are carbonic, boric, citric, acetic, caproic, chloroacetic, tartaric, gluconic, glycolic and the like. For optimum results, particularly where the resulting compound is to be used as a disinfectant, the preferred acids are strong mineral acids having a dissociation constant greater than $1\times10^{-3}$. Acids of this type may be represented by hydrochloric, hydrobromic, sulfuric, phosphoric, etc.

It should be noted that if the bivalent radical previously designated by A should contain less than four atoms between the amidine groups it would be susceptible to cyclization. This is generally to be avoided for optimum results over a wide range of uses.

Among the many iminoether salts which are suitable for use in the preparation of the desired amidine derivatives are the following: Caprylonitrile methyliminoether hydrochloride, capric acid nitrile methyliminoether hydrochloride, lauronitrile methyl iminoether hydrobromide, myristonitrile methyliminoether sulfate, palmitonitrile methyliminoether phosphate, stearonitrile methyliminoether hydrochloride, arachidonitrile methyliminoether hydrochloride, alpha-methylstearonitrile methyliminoether hydrochloride, alpha-ethyllauronitrile methyliminoether hydrochloride, oleonitrile methyliminoether hydrochloride, 4-ethyl-hexahydrobenzonitrile methyliminoether hydrochloride, hexahydrobenzonitrile methyliminoether hydrochloride, iminoether hydrochlorides prepared from the nitriles of coconut oil fatty acids, etc.

A representative few of the many diamines which are suitable for use in the preparation of the desired amidine derivatives are the following: Tetramethylenediamine, pentamethylenediamine, hexamethylenediamine, heptamethylenediamine, octamethylenediamine, nonamethylenediamine, decamethylenediamine, dodecamethylenediamine, hexadecamethylenediamine, octadecamethylenediamine, p-phenylenediamine, 1,4-diaminocyclohexane, p-xylylenediamine, o-xylylenediamine, 2-methylhexamethylenediamine, 5-ethyldecamethylenediamine, 1,10 - diaminodecene - 4, N,N' - dimethyldecamethylenediamine, N,N'-diethylhexamethylenediamine, N,N' - di - n - butyldecamethylenediamine, N,N'-di-n-amyldecamethylenediamine, 2,3-dihydro-2-di - (3 - aminopropyl) naphthalene.

Reaction of the diamine with the iminoether salts is carried out in a suitable solvent, preferably methanol or ethanol. It should be understood, however, that this reaction may take place in other solvents or mixtures thereof or even in the complete absence of any solvent.

This reaction proceeds readily at temperatures within the range of about −50° C. to about 120° C. The preferred temperature range for the majority of reactions is generally about 25° C. to about 30° C.

The reaction is customarily carried out at atmospheric pressure. However, it may also be accomplished under superatmospheric or subatmospheric conditions.

Proportions of reactants may vary widely, although the preferred amounts involve two molecules of iminoether salt for one molecule of diamine. If an excess of iminoether salt should be used, it will be recovered in the reaction mixture either as such or as the corresponding amide into which the iminoether salts decompose readily. If an excess of diamine is used, incomplete reaction takes place and a portion of the diamine is recovered unchanged from the reaction mixture in addition to varying amounts of product containing only one amidine group and one unreacted amino group.

Bis-amidine salts referred to herein may be used as disinfectant compositions, for which purpose they may be dissolved in any suitable solvent such as water or alcohol. Instead of dissolving them in a solvent they may also be used as dry compositions in which they may be diluted with inert ingredients such as talc or clay. These compounds may be used either alone in combination with one another and/or in combination with prior art disinfectant materials such as, for example phenolic compounds, Metaphen, Zephiran, etc.

These amidine derivatives exhibit surprisingly high bactericidal and bacteriostatic activity. They are active against a variety of organisms such as Staphylococcus, Streptococcus, Pneumococcus, *Bacillus typhosis*, *B. coli*, and the like. The products are also active against other single-celled organisms such as amoebae. These compounds are likewise active against molds and other fungi, e. g., *Aspergillus niger*, and the various lumber molds.

By means of the present invention a large number of exceedingly effective disinfectants are made available for the first time. These compounds are suitable for use for many purposes wherein prior art disinfectants would be either of slight value or actually harmful. The composition embraced herein may be used to disinfect cuts and open wounds, to sterilize the skin, to sterilize instruments and other inanimate objects, to control bacteria and mold growth on fibers, fabric, etc. These compounds are not subject to deterioration in the presence of blood, blood serum and other natural protein materials. Likewise, they are free from mercury and other heavy metal salts to which many individuals are allergic. In addition, these compounds are new and are suitable for use for a variety of other purposes in the chemical arts.

As many widely different embodiments of this invention may be made without departing from the spirit and scope thereof, it is to be understood that the invention is not limited to the specific embodiments thereof except as defined in the appended claims.

We claim:

1. A new compound having the following general formula:

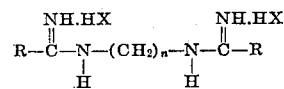

wherein R is a member selected from the class consisting of monovalent, straight chain, saturated, aliphatic hydrocarbon radicals of ten to eighteen carbon atoms; $n$ is an integer from six to ten; and X is an anion of a strong inorganic acid having a dissociation constant greater than $1 \times 10^{-3}$.

2. A new compound, possessing disinfecting properties, comprising N,N′-hexamethylene-bis-lauramidine hydrochloride.

3. A new compound, possessing disinfecting properties, comprising N,N′-decamethylene-bis-lauramidine hydrochloride.

4. A new compound having the following general formula:

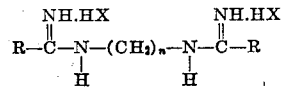

wherein R is a member selected from the class consisting of monovalent, straight chain, saturated, aliphatic hydrocarbon radicals of ten to eighteen carbon atoms; $n$ is an integer from six to ten; and X is an anion of an acid having a dissociation constant greater than $1 \times 10^{-11}$.

MADISON HUNT.
JAMES E. KIRBY.
JOHN F. LONTZ.